(No Model.)
E. T. GREENFIELD.
PIPE OR TUBE COUPLING.
No. 595,437. Patented Dec. 14, 1897.
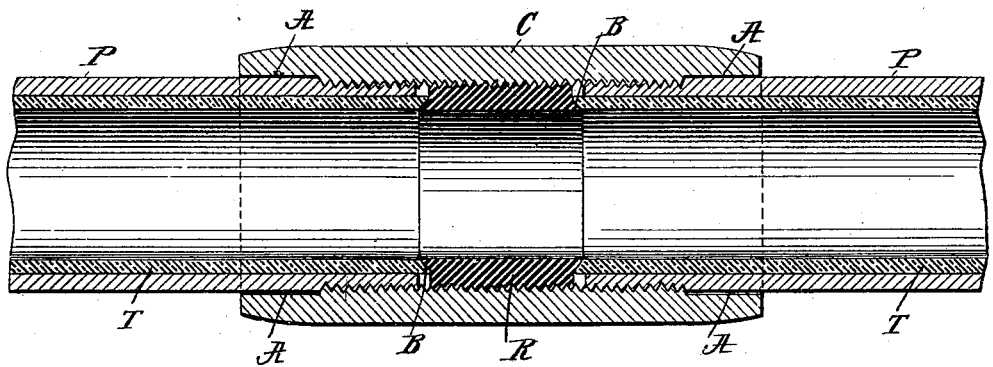
Witnesses
Edward C. Rowland
M. M. Robinson
Inventor
Edwin T. Greenfield
By his Attorney
Charles J. Kintner

United States Patent Office.

EDWIN T. GREENFIELD, OF NEW YORK, N. Y.

PIPE OR TUBE COUPLING.

SPECIFICATION forming part of Letters Patent No. 595,437, dated December 14, 1897.

Application filed March 5, 1897. Serial No. 626,110. (No model.)

*To all whom it may concern:*

Be it known that I, EDWIN T. GREENFIELD, a citizen of the United States, residing at New York, in the county of New York and State of New York, have made a new and useful Invention in Pipe or Tube Couplings, of which the following is a specification.

My invention is directed particularly to improvements in pipe or tube couplings designed to connect together the screw-threaded ends of two pipes or tubes; and its object is to construct such a coupling as will give greater strength to the united pipes or tubes, so that they may be readily bent to any degree without danger of rupture, and it will be fully understood by referring to the accompanying drawing, which is a longitudinal sectional view of a pair of lined conduit pipes or tubes screw-threaded at their adjacent ends and joined together by my improved coupling.

In the manufacture and use of iron-armored conduit-tubes with insulating-linings I have discovered that where the tubes are comparatively thin and their screw-threaded ends are connected together by the ordinary form of screw-threaded coupling, in which the screw-threads extend to the outer ends of the coupling, the tubing will often rupture or break at such ends when slightly bent, and it was with a view of overcoming this objectionable feature that the present invention was devised.

Referring now to the drawing in detail, P represents two iron or steel armored conduit-tubes of well-known form provided each with an interior lining of insulating material T, said conduit-tubes being screw-threaded, as shown, at their adjacent ends, and R is an insulating-thimble of substantially the interior diameter as the tubular lining T.

C represents my improved coupling, which is screw-threaded interiorly and provided at each end with a projecting sleeve A, adapted to extend over and fit snugly around the body portions of the pipes or tubes P, as shown, the arrangement being such that when the pipes or tubes are secured firmly in position the insulating-linings T T bear snugly against the insulating-thimble R. On attempting to bend said united pipes or tubes at any point near the coupling there will be formed a bearing between the outer faces of the pipes or tubes and the interior faces of the projecting sleeves A A, and the strain will be such as to draw longitudinally upon the screw-threads rather than directly at an angle, as is the case with well-known forms of pipe-couplings, in which the screw-threads of the coupling extend to the outer ends thereof.

In constructing my improved coupling C it is screw-threaded interiorly, as shown, and reamed out at the ends A to a depth substantially equal to that of the screw-threads. The insulating-thimble R is then secured in place, as shown, and it is ready for use, the tubes being secured in the manner shown, with the insulating-linings bearing snugly against the ends of said thimble.

Although I have disclosed my improved pipe or tube coupling in connection with electrical conduit pipes or tubes insulated interiorly, I desire it understood that my claims hereinafter made are of such scope as to include, broadly, my improved form of coupling in connection with such lined metal pipes generally wherever used in the arts.

The especial utility of my invention lies in its adaptability to unite the screw-threaded ends of lined metal pipes or tubes in such manner that said pipes or tubes may be bent to almost any angle without danger of rupture. The most important point of novelty and utility, however, lies in being able to unite thin metal pipes together which are lined with insulating material adapted to bend with the pipes united together by my improved coupling. These pipes are preferably of steel or iron and are lined with oil-cloth or other moisture-resisting insulating material in the same manner as disclosed in my prior applications, bearing Serial No. 608,146, filed October 7, 1896, and Serial No. 615,116, filed December 10, 1896, the improved coupling enabling one to bend the pipes or tubes around short curves at will.

Having thus described my invention, what I claim, and desire to secure by Letters Patent of the United States, is—

1. A pipe or tube coupling screw-threaded interiorly and having projecting sleeves at its opposite ends, in combination with an insulating-thimble secured near its central portion, substantially as described.

2. A pipe or tube coupling screw-threaded interiorly and provided with an insulating-thimble near its central portion, said coupling having projecting sleeves at its opposite ends, in combination with a pair of pipes or tubes screw-threaded at their adjacent ends and provided with insulating-linings adapted to abut against the ends of the thimble, the projecting sleeves of the coupling being adapted to fit snugly about the outer faces of the united pipes or tubes, substantially as described.

3. A pair of metal conduit-tubes P P screw-threaded at their adjacent ends and provided with insulating-linings T T, in combination with a screw-threaded coupling C having secured near its center an insulating-thimble R, said coupling being provided with projecting sleeves A A adapted to fit snugly about the body portions of the united tubes P P and all acting, substantially as and for the purpose described.

4. A pair of metal conduit-tubes screw-threaded at their adjacent ends and provided with insulating-linings of oil-cloth or other pliable material, in combination with a screw-threaded coupling having secured near its center an insulating-thimble, said coupling being provided with projecting sleeves adapted to fit snugly about the body portions of the united tubes, all of said parts being adapted to be bent without rupturing either the insulating-lining or the screw-threaded junctions, substantially as described.

In testimony whereof I have hereunto subscribed my name this 5th day of February, 1897.

EDWIN T. GREENFIELD.

Witnesses:
C. J. KINTNER,
M. M. ROBINSON.